Sept. 20, 1971          R. L. SIMON          3,606,083

MEASURING AND TRANSFERRING APPARATUS

Filed Aug. 18, 1969

INVENTOR
RICHARD L. SIMON

BY *William R. Moran*

ATTORNEY

United States Patent Office 3,606,083
Patented Sept. 20, 1971

3,606,083
MEASURING AND TRANSFERRING APPARATUS
Richard L. Simon, Rye, N.Y., assignor to Union Carbide Corporation, New York, N.Y.
Filed Aug. 18, 1969, Ser. No. 851,017
Int. Cl. B67b 7/00
U.S. Cl. 222—1
10 Claims

ABSTRACT OF THE DISCLOSURE

An apparatus for the precise measurement and transfer of liquids in a centrifugal field is comprised of an annular disk having a plurality of reservoir chambers, capillary measuring tubes extending into the chambers and communicating to a discharge port on the disk, means for rotating the apparatus and means for collecting dispensed liquid.

---

Figure 1:
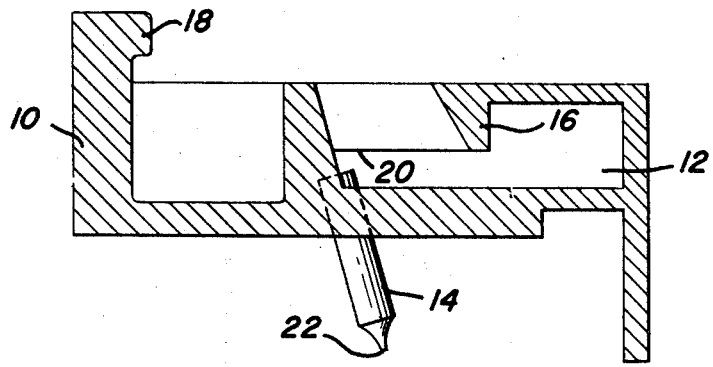

This invention relates, in general, to a novel measuring and transferring apparatus. In one aspect, this invention relates to an apparatus for measuring and transferring precise volumes of liquids. In a further aspect, this invention relates to a measuring and transferring apparatus which is particularly useful for rapidly dispensing precise volumes of liquids for microanalytical photometric systems.

In the past few years the need for devices to measure and accurately dispense precise volumes of liquids, particularly in the microliter range, has increased markedly. For example, in the pharmaceutical field many drugs are dispensed into vials in liquid form in volumes of a few milliliters or less and hence the need for automatic equipment which will measure and dispense accurately and rapidly is apparent. Additionally, rapid, automatic analytical devices are currently in demand due to the ever increasing requirement for microanalytical studies in biochemical research, routine clinical testing, enzymatic studies and the like.

However, to date, there are few devices available for the rapid and accurate measurement and transfer of small volumes of liquids. Either expensive and/or elaborate equipment is required or delays encountered while well known but time consuming techniques are utilized. In many instances, the speed at which liquids are measured and dispensed is an important factor. For example, in colorimetric analyses it is often critical that a series of reactions be started at exactly the same time if reliable results are to be obtained. This is particularly important for enzymatic studies wherein measurements can often be taken after the reaction has proceeded for only a few seconds or minutes.

Furthermore, multistation analytical photometers which utilize a centrifugal field are presently becoming available for the rapid microanalysis of a wide variety of liquids such as body fluids, e.g., blood serum, food products, and the like. Since numerous analyses can be performed rapidly and simultaneously the need for devices to accurately measure and dispense liquids rapidly is obvious.

It is therefore an object of this invention to provide a novel measuring and transferring apparatus. Another object of this invention is to provide an apparatus for measuring and transferring precise volumes of liquids. A further object is to provide an apparatus which is useful for rapidly dispensing precise volumes of liquids for microanalytical studies. A still further object of this invention is to provide an apparatus which is particularly useful for rapidly measuring and dispensing liquids in a multistation analytical photometer. These and other objects will readily become apparent to those skilled in the art in the light of the teachings herein set forth.

In its broad aspect, the present invention relates to an apparatus for the precise measurement and transfer of liquids in a centrifugal field. The invention also relates to a process which utilizes the aforementioned apparatus. The apparatus is comprised of, in combination, an annular disk having on its upper surface at least one reservoir chamber, at least one capillary measuring tube, the open end of which is disposed in the reservoir chamber at an angle which is less than a right angle to the direction of force created by the centrifugal field, and the other end of the capillary measuring tube communicating to a discharge port on the disk, means for rotating said apparatus to create a centrifugal force, and means for collecting said liquid when said apparatus is rotated.

The apparatus of this invention provides a method for rapidly measuring and dispensing precise volumes of liquid in a centrifugal field. When the reservoirs of the annular disk are filled with liquid to a level sufficient to cover the open end of the capillary tube, capillary action causes the tube to fill to a predetermined volume. Thereafter the disk is rotated, at a speed sufficient for the centrifugal force to move all the liquid from outside the tip or open end of the tube to one end of the reservoir chamber. As the speed of the rotor further increases, the centrifugal force becomes great enough to dispense the measured volume of liquid from the capillary tube into a receiving receptacle or reaction chamber.

Figure 2:
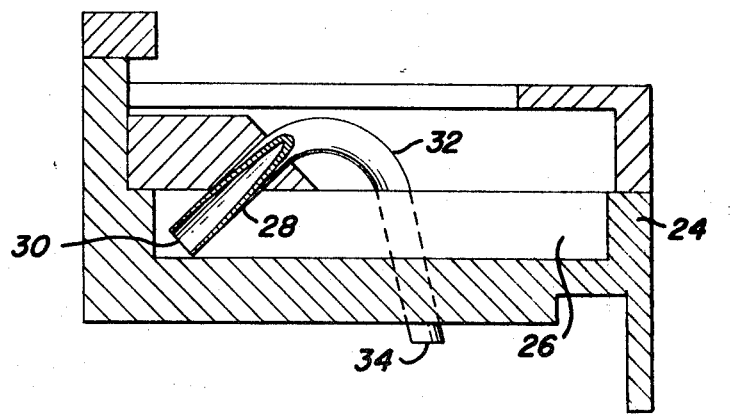
Figure 3:
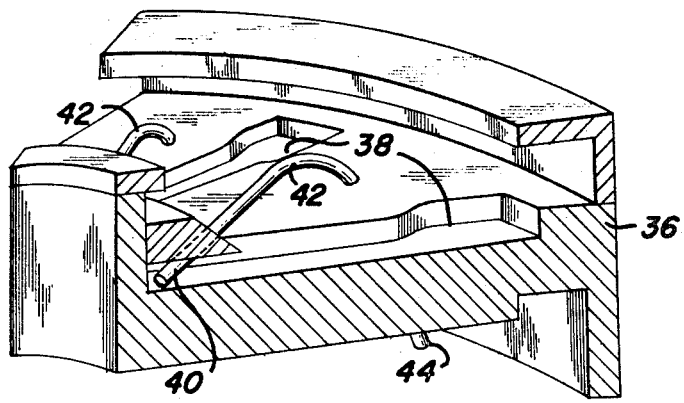

The objects of the invention and the preferred embodiments thereof will best be understood by reference to the accompanying drawings, wherein FIGS. 1 and 2 are cross sectional views of two different embodiments of the apparatus and FIG. 3 is a perspective view of a section of the apparatus shown in FIG. 2.

With reference to the drawings, the apparatus of this invention as shown in one embodiment in FIG. 1, is comprised of an annular disk 10 which is constructed in such a manner that it has a reservoir chamber 12 extending outwardly to the outer peripheral wall of the disk and an upstanding inner peripheral wall 18 which provides means for the operator to grasp the disk and remove it from the rotor source and collecting receptacles. Reservoir chamber 12 can be equipped with a member 16 to prevent splashing of the liquid contained in the reservoir chamber when the disk is rotated at high speeds. Alternatively, the chamber 12 can be equipped with an outlet (not shown) whereby the liquid can be discharged into a basin contained on the disk so as to completely empty the reservoir chamber. Capillary tube 14 extends from the reservoir chamber 12, through the disk 10 to a discharge port on the lower surface. Liquid which is placed in the chamber, need not be measured accurately but is added by the operator in an amount so that the liquid level 20 is above the open end of the capillary tube. As hereinafter indicated, the discharge end of the tube 22 can be tapered or of the same internal diameter as the entrance end.

FIG. 2 depicts another embodiment of the apparatus wherein cross-sectional view the capillary tube 28 is disposed downwardly into the reservoir chamber 26 of annular disk 24. The entrance or open end 30 of capillary tube 28 is arranged to be below the level of the chamber when liquid is added. Communicating with capillary tube 28 and discharge port 34 is tube 32 which is constructed of materials which do not retain any liquid on its inner walls when the disk is rotated. Suitable materials are polymers of tetrafluoroethylene. A particular advantage of this embodiment is that tube 32 need not pass through the bottom of the reservoir chamber but can pass through the disk at a point adjacent to the chamber. This avoids the necessity of providing a liquid-tight seal where the tube passes through the bottom of the reservoir chamber.

It should be noted, however, that the location of the discharge port need not be on the lower surface of the annular disk but can be located most anywhere as long as it is positioned at a point further from the rotational center of the disk than is the entrance or open end of the capillary tube. For instance, the discharge port could be located on the outer peripheral edge of the disk and the liquid discharged into receptacles contained on a second annular disk the inner diameter of which is slightly larger than the outer diameter of the first annular disk. Alternatively, the tubes can be arranged so that liquid is transferred to other receptacles or reaction zones contained on the surface of the annular disk and interspaced between the reservoir chambers.

FIG. 3 is a pie shaped, perspective view of the apparatus shown in FIG. 2. Annular disk 36 contains a plurality of reservoir chambers 38 and capillary tubes 40. Tube 42 communicates with capillary 40 and discharge port 44 by passing through disk 36 at a point between reservoir chambers 36.

The shape of the reservoir chamber on the disk is not necessarily critical and any one of several can be employed. For example, the reservoir chambers can be circular and located around the peripheral edge of the disk or around the inner edge. They can also be oblong, rectangular, pyramidal with the apex pointing towards the inner edge, or the like.

In practice, a wide variety of capillary tubes can be employed in the apparatus of this invention. It is important however, that the tubes be of uniform internal diameter to insure uniform liquid measurement. In the embodiment described in FIG. 1, the discharge end of the tube can be tapered, if desired, so that a tube with a larger internal diameter can be employed and yet the liquid will not dispense until after the liquid in the reservoir chamber is pushed to one side.

Thin wall, precision bore capillary tubes having diameters of, for example, 1.5–2.0 millimeters are commercially available and calibrated to draw up precise volumes of liquids, e.g., 0.5 milliliter, 0.75 milliliter, and the like. Thus, the volume of liquid taken up into the capillary tube will, of course, be mainly dependent upon the internal diameter of the tube itself.

In general, it has been observed that the apparatus of this invention is well suited for measuring and transferring with a high degree of accuracy liquid volumes as small as 5 lambda and lower. It is particularly suitable for measuring and transferring liquid volumes of from about 5 lambda to about 50 lambda and higher. Volumes larger than this can, of course, be measured and transferred depending upon the internal diameter of the capillary tube.

It has been observed that the angle which the tube makes with the centrifugal field is not necessarily critical as long as it is less than ninety degrees, i.e., the end opposite the end in the liquid leans toward the outer peripheral edge of the disk.

In general, the apparatus of this invention can be utilized for transferring or dispensing liquids into vials, reaction chambers, storage chambers or the like. It is, of course, apparent, that the liquid receptacle must be positioned at a point where it can receive the liquid being dispensed. Moreover, the receptacle must be rotated so that it is synchronized at the same speed as the disk. Hence, the apparatus of this invention can be utilized for dispensing pharmaceutical or other liquids into vials contained on a coacting annular disk positioned so as to receive the discharged liquid.

The apparatus of this invention is particularly useful for dispensing reagents or samples for microanalyses in a multiple cuvette rotor of the type described in Analytical Biochemistry 28 545–562 (1969). This device employs the principle of double-beam spectrophotometry wherein absorbencies of a liquid sample and a reference solution are intercompared. A plurality of samples move rapidly past a fixed light beam by using a cuvette rotor. The centrifugal field provides the force for moving the samples and reagents into the cuvette, mixing, removal of air bubbles and sedimenting solid particles, and the like.

The apparatus of this invention is easily adapted to the cuvette rotor and can be positioned over the sample and/or reagent chambers. For instance, in the sample and reagent transfer and loading disks, as set forth on p. 551 of the aforementioned article, the annular disk of this invention can be placed over the concentric fluid holding cavities so that the liquid is dispensed into one or more of the cavities. The apparatus can be designed, as indicated in the drawings, for easy removal from the rotor.

In practice it should be noted that the apparatus of this invention is particularly useful for repeatedly measuring and transferring precise volumes of the same liquid. If sufficient liquid is placed in the reservoirs, and the centrifugal force decreased by slowing the rotation of the annular disk, the liquid will flow back to cover the open end of the capillary which will then fill due to capillary action. Upon increasing the speed of the rotor, a second precise volume of liquid will be dispensed.

The measuring and transferring apparatus of this invention can be constructed of most any type of material which will withstand rotations of up to 2000 r.p.m. and higher. For example, the apparatus can be fabricated from Teflon, Pyrex, stainless steel and the like. It is advantageous however, to have the apparatus constructed from a material such as Teflon which is inert to samples and reagents so that the reservoir chambers can be made by merely cutting cavities in the disk. The capillaries will in most instances be of glass although other materials can also be used. As previously indicated, the tube communicating from the capillary to the discharge port is preferably Teflon.

Although the invention has been illustrated by the preceding disclosure it is not to be construed as being limited to the particular embodiments or materials disclosed therein. Rather, the invention encompasses the generic area as hereinbefore disclosed. Various modifications and embodiments thereof can be made without departing from the spirit and scope thereof.

What is claimed is:

1. An apparatus for the precise measurement and transfer of liquids in a centrifugal field, said apparatus comprised of, in combination, an annular disk having on its upper surface at least one reservoir chamber, at least one capillary measuring tube, the open end of which is disposed in said reservoir chamber at an angle which is less than a right angle to the direction of force created by the centrifugal field, and the other end of said capillary measuring tube communicating to a discharge port on said disk, and means for rotating said apparatus to create a centrifugal force.

2. The apparatus of claim 1 wherein the open end of said capillary measuring tube extends down into said reservoir chamber at an angle which is less than a right angle to the direction of force created by the centrifugal field and the other end of said tube communicates through the disk at a point adjacent to said reservoir to a discharge port on said disk.

3. The apparatus of claim 2 wherein said capillary tube communicates to a discharge port on said disk by a tube which resists retention of liquids.

4. The apparatus of claim 3 wherein said tube is comprised of a tetrafluoroethylene polymer.

5. The apparatus of claim 4 wherein said discharge port is located on the lower surface of said disk.

6. The apparatus of claim 1 wherein said annular disk has a single reservoir chamber around the peripheral edge and a plurality of capillary measuring tubes.

7. The apparatus of claim 1 wherein said annular disk has a plurality of individual reservoir chambers.

8. The apparatus of claim 7 wherein said each reservoir chamber has more than one capillary tube.

9. A method for the precise measurement and transfer of liquids which comprises filling the reservoir chamber of the apparatus of claim 1 with a liquid until the open end of said capillary tube is below the surface of the liquid and capillary action causes said tube to fill to a precise level, rotating said apparatus to create centrifugal forces sufficient to sequentially (a) remove away from the open end of said tube all liquid except that which is retained in said tube, and (b) to remove said retained liquid from said tube and dispense it.

10. The apparatus of claim 1 wherein the open end of said capillary measuring tube extends up through said disk into said reservoir chamber at an angle which is less than a right angle to the direction of force created by the centrifugal field and the other end of said tube communicates to a discharge port on said disk.

References Cited

UNITED STATES PATENTS

| | | | |
|---|---|---|---|
| 2,582,523 | 1/1952 | Beglinger | 137—262 |
| 3,068,679 | 12/1962 | Knerr et al. | 68—174X |
| 3,175,732 | 3/1965 | Unger | 141—34X |

M. HENSON WOOD, JR., Primary Examiner

T. C. CULP, JR., Assistant Examiner

U.S. Cl. X.R.

222—410; 233—46